Figure 1B:
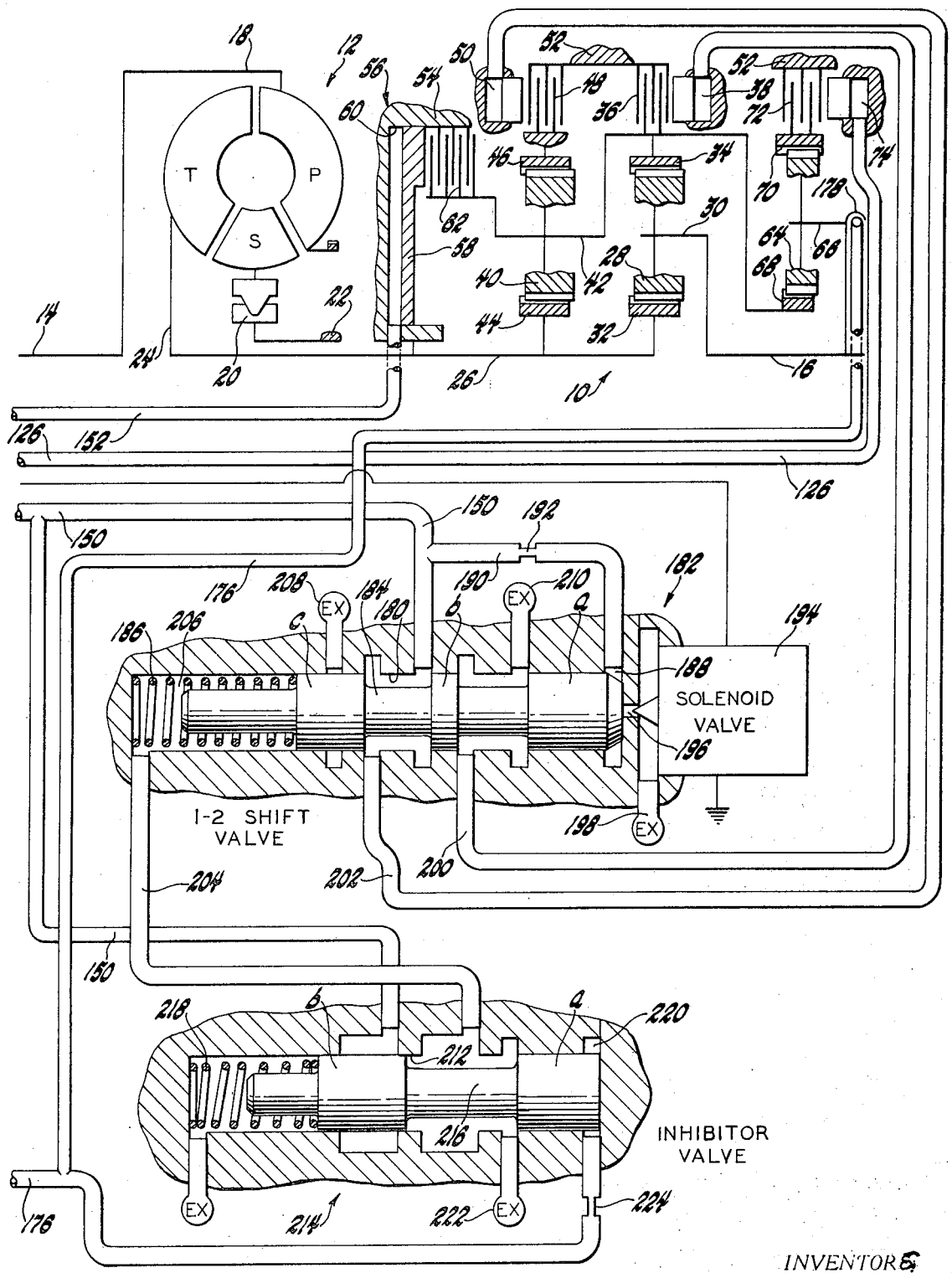

United States Patent [19]
Schaefer et al.

[11] 3,709,064
[45] Jan. 9, 1973

[54] MULTI-RATIO TRANSMISSION AND CONTROL WITH DOWNSHIFT INHIBITORS

[75] Inventors: Robert H. Schaefer, Westfield; Richard H. Williams, Indianapolis, both of Ind.

[73] Assignee: General Motors Corporation, Detroit, Mich.

[22] Filed: Feb. 10, 1971

[21] Appl. No.: 114,268

[52] U.S. Cl.............................74/752 A, 74/864, 74/867, 74/869
[51] Int. Cl.............................................F16h 5/42
[58] Field of Search .74/752 A, 752 C, 864, 867–869

[56] References Cited
UNITED STATES PATENTS

| | | |
|---|---|---|
| 3,313,183 | 4/1967 | Bailey et al. .........................74/752 C |
| 3,056,313 | 10/1962 | Lindsay ...............................74/752 C |
| 3,095,755 | 7/1963 | Duffy...................................74/752 C |
| 3,433,098 | 3/1969 | Schaefer..............................74/752 C |
| 3,448,640 | 6/1969 | Nelson.................................74/752 A |

Primary Examiner—C. J. Husar
Attorney—W. E. Finken, A. M. Heiter and D. F. Scherer

[57] ABSTRACT

A transmission and control having a plurality of forward drive ratios and solenoid controlled shift valves for controlling ratio interchange. Inhibitor valves are included to prevent downshifting of the shift valves when the transmission speed is above a predetermined value.

2 Claims, 2 Drawing Figures

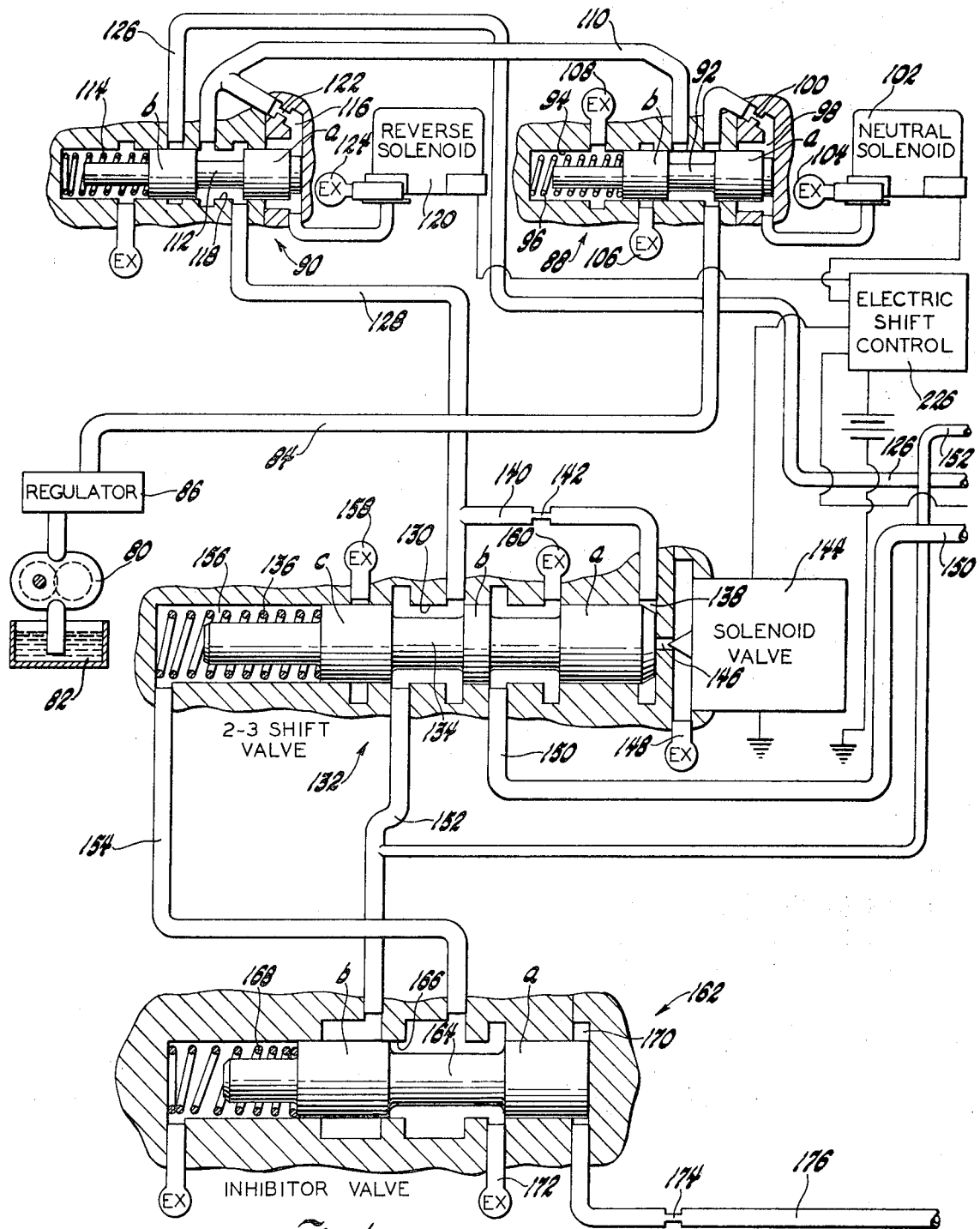

3,709,064

MULTI-RATIO TRANSMISSION AND CONTROL WITH DOWNSHIFT INHIBITORS

The invention herein described was made in the course of work under a contract or subcontract thereunder with the Department of Defense.

This invention is related to transmissions and controls and more particularly to transmissions in which the controls prevent a ratio downshift above a predetermined transmission speed.

The present device includes a planetary transmission having three forward drive ratios and a reverse drive ratio. A pair of shift valves are incorporated to control the interchange of drive ratios by supplying system pressure to friction devices associated with the gearing. A pair of inhibitor valves are in fluid communication with the shift valves and are responsive to a transmission governor signal pressure. When the governor signal pressure is above a predetermined value one or both of the inhibitor valves is moved to an inhibit position. In the inhibit position, the inhibitor valves direct main pressure to the upshift end of the shift valves to prevent a ratio downshift from third to second or second to first.

The shift valves are electrically controlled by solenoid valves that are normally open, thereby preventing fluid pressure from developing in the shift control chamber. When the transmission is conditioned for first ratio operation both solenoid valves are energized thereby closing the shift control chamber to permit fluid pressure in the chamber to move the shift valves to the downshifted position against a spring so that fluid pressure is delivered to the low brake in the transmission. On a shift from first to second ratio, one solenoid valve is deenergized so that the spring moves the shift valve to the upshifted position thereby exhausting the low brake while directing fluid to the second brake. On a shift from second to third ratio; the one solenoid valve remains deenergized while the other solenoid is also deenergized thereby exhausting fluid flow to the first shift valve and the second brake while directing fluid pressure to the high clutch.

Each shift valve is also controlled by an inhibitor valve which is responsive to a governor pressure proportional to transmission speed. In response to predetermined governor pressures the inhibitor valves are shifted thereby directing apply pressure of the various friction devices to a chamber on the shift valve opposing the pressure in the shift control chamber to hold the shift valve in the upshifted position. The transmission will remain in the hold condition, even though the operator may select a lower drive ratio, until the governor pressure decreases sufficiently to permit the inhibitor valve to move to the unshifted position.

In the event of failure of both solenoid valves the transmission will be conditioned for the third drive ratio.

It is an object of this invention to provide in an improved transmission control an inhibitor valve for directing main pressure to a control chamber on the shift valve to prevent downshifting of the shift valve in response to a downshift pressure above a predetermined transmission speed.

Another object of this invention is to provide in a transmission control a pair of shift valves each shiftable in response to pressure in a solenoid control chamber for controlling the interchange of friction devices and a pair of inhibitor valves each responsive to a transmission governor for directing fluid pressure to the shift valves in opposition to the solenoid control chamber to prevent downshifting of the shift valves.

These and other objects and advantages of the invention will be more apparent from the following description and drawings in which:

FIGS. 1a and 1b when combined are a schematic representation of a transmission and control.

Referring to the drawings and particularly FIG. 1b there is shown a transmission having a planetary gearing unit 10, a torque converter 12, an input shaft 14 and an output shaft 16. The input shaft 14 drives the torque converter housing 18, which drives the torque converter pump P to circulate fluid through the turbine T and the Stator S which is held by the one-way brake 20 attached to the grounded sleeve 22. The turbine is connected by a hub 24 to drive an intermediate shaft 26.

The low planetary gear set has planetary pinions 28 mounted on a carrier 30 which is connected to drive the output shaft 16. The pinions mesh with sun gear 32 driven by intermediate shaft 26 and ring gear 34 which may be retarded by the low brake 36 when engaged by the fluid motor 38 to establish low ratio drive in the planetary gearing unit. The intermediate gear set has planetary pinions 40 mounted on a carrier 42 which is connected to drive the ring gear 34. The pinions 40 mesh with sun gear 44 driven by shaft 26 and ring gear 46 which may be retarded by the intermediate brake 48 when engaged by the intermediate motor 50 to establish intermediate range ratio drive. The low and intermediate motor 38 and 50 are conventional motors having a piston mounted in a cylinder on the fixed housing 52. The motors are selectively actuated on the supply of fluid thereto to engage the respective brake. Each brake has alternate plates splined to the housing and intermediate plates splined to the associated ring gear. Retraction springs (not shown) release the brakes. The intermediate shaft 26 is also connected to drive the hub 54 of a motor 56. The motor 56 has a piston 58 in a cylinder 60. In the supply of fluid, the piston is moved to engage the high clutch 62 which connects the hub 54 driven by shaft 26 to the carrier 42 to lock up the planetary gearing for forward one to one drive or high ratio. The clutch is of the plate type with alternate plates splined to hub 54 and intermediate plates splined to a part of carrier 42.

The reverse planetary gear set has planetary pinions 64 mounted on a carrier 66 drivingly connected to the output shaft 16. The pinions mesh with a sun gear 68, which is connected with ring gear 34, and a ring gear 70, which may be retarded by a reverse brake 72 when engaged by the fluid motor 74 to establish reverse drive. The brake 72 has plates alternately splined to the fixed housing 52 and the ring gear 70. As can be seen from the above description, the planetary gearing unit 10 provides three forward drive ratios and a reverse drive ratio.

The clutches and brakes which control the gear ratios of the planetary gearing 10 are fluid operated devices. The fluid for these devices is supplied by conventional gear pump 80 shown in FIG. 1a. The pump 80 draws fluid from a reservoir 82 and delivers fluid via a main pressure passage 84. The pressure in passage 84 is controlled by a conventional regulator valve 86. The passage 84 is connected with a neutral control valve generally designated 88.

The neutral control valve 88 has a valve spool 92 having equal diameter spaced lands a and b slidably disposed in a valve bore 94, a compression spring 96 and a control chamber 98. The control chamber 98 is supplied with pressure fluid from passage 84 through a restriction 100. The pressure in the control chamber 98 is controlled by a neutral solenoid valve 102 such that when the solenoid valve 102 is energized the chamber 98 is closed to the exhaust port 104 so that fluid pressure in chamber 98 acting on the end of land a will cause valve spool 92 to move against the spring 96. The valve bore 94 is in fluid communication with a pair of exhaust ports 106 and 108, a feed passage 110 and the main passage 84. In the position shown that is with the neutral solenoid deenergized and the chamber 98 exhausted the valve spool 92 is positioned between spring 96 so that main passage 84 is in fluid communication between lands a and b with the feed passage 110. When the solenoid valve 102 is energized, the valve spool 92 is shifted thereby connecting feed passage 110 to exhaust 106, and blocking passage 84 from passage 110 at land a.

A reverse control valve 90 has a valve spool 112 having equal diameter spaced lands a and b, a compression spring 114 and a control chamber 116. The valve spool 112 is slidably disposed in a valve bore 118. Fluid pressure in the control chamber 116 is controlled by reverse solenoid 120 such that when the solenoid valve 120 is deenergized fluid pressure supplied to chamber 116 from passage 110 through a restriction 122 is exhausted so that the valve spool 112 is in the position shown. When the solenoid valve 120 is energized the chamber 116 is closed to exhaust port 124 so that pressure developed in the chamber 116 moves the valve spool 112 against the spring 114 thereby connecting passage 110 with a reverse apply passage 126. The reverse apply passage 126 is in fluid communication with the fluid motor 74 such that when the reverse apply passage 126 is pressurized a reverse brake 72 is engaged. When the reverse solenoid valve 120 is deenergized the reverse apply passage 126 is in fluid communication between lands a and b with a primary feed passage 128.

The primary feed passage 128 is in fluid communication with a valve bore 130 of a 2–3 shift valve generally designated 132. The 2–3 shift valve 132 also has a valve spool 134 with equal diameter spaced lands a, b and c slidably mounted in the bore 130, a compression spring 136 and a downshift control chamber 138. The downshift control chamber 138 is in fluid communication with primary feed passage 128 through a passage 140 and a restriction 142. Fluid pressure in the downshift control chamber 138 is controlled by a solenoid valve 144 such that when the solenoid valve 144 is deenergized the downshift control chamber 138 is exhausted through a port 146 to an exhaust port 148. When the solenoid valve 144 is energized the bore 146 is blocked so that pressure develops in downshift control chamber 138 to apply a force on valve land a in opposition to the spring 136. Also in fluid communication with the valve bore 130 is a secondary feed passage 150, a high clutch apply passage 152, a control passage 154 and a pair of exhaust passages 158 and 160. The control passage 154 is in fluid communication with an inhibitor chamber 156 adjacent valve land c. In the position shown the high clutch apply passage 152 is in fluid communication between lands b and c with the primary feed passage 128 while the secondary feed passage 150 is exhausted between lands a and b through passage 160. When the solenoid valve 144 is energized the secondary feed passage 150 will be in fluid communication with primary feed passage 128 between lands a and b while the high clutch apply passage 152 will be exhausted through passage 158 by lands b and c. The high clutch apply passage 152 is in fluid communication with the fluid motor 56 so that when the high clutch apply passage 152 is pressurized the high clutch 62 is engaged. The high clutch apply passage 152 and the control passage 154 are also in fluid communication with an inhibitor valve generally designated 162.

The inhibitor valve 162 and valve spool 164 have equal diameter spaced lands a and b slidably disposed in valve bore 166, a compression spring 168 and a governor control chamber 170. The valve bore 166 is in fluid communication with an exhaust passage 172 so that when the inhibitor valve 162 is in the position shown the control passage 154 and, therefore, inhibitor control chamber 156 are exhausted between lands a and b through passage 172 while the high clutch apply passage is blocked by land b. The governor control chamber 170 is in fluid communication through a restriction 174 and a governor passage 176 with a conventional pitot tube type governor generally designated 178. The governor 178 is adjacent the carrier 66 which is driven with the output shaft 16 and therefore reflects a speed proportional to the output speed of the planetary gearing 10. When the output speed of the planetary gearing is sufficiently high so that the pressure in the governor control chamber 170 is sufficient to overcome the force in spring 168, the valve spool 164 will be shifted thereby providing fluid communication between the high clutch apply passage 152 and the inhibitor chamber 156 through the control passage 154 between lands a and b. The governor pressure necessary to cause the inhibitor valve 162 to assume its shifted position is dependent upon the area of land a and the force in the spring 168. Thus, the shift point of the inhibitor valve 162 can be controlled to a predetermined value by selecting proper values for these two controlling elements. When the inhibitor valve 162 is shifted and the high clutch apply passage is pressurized the inhibitor chamber 156 will be pressurized thereby assisting the spring 136 so that fluid pressure in the control chamber 138 cannot cause the shift valve 132 to move to its shifted position. Thus, a downshift from third to second above the predetermined speed is prevented.

The secondary feed passage 150 is in fluid communication with a valve bore 180 of a 1–2 shift valve generally designated 182. The 1–2 shift valve 182 also includes a valve spool 184 having equal diameter spaced lands a, b and c slidably disposed in the valve bore 180, a compression spring 186 and a downshift control chamber 188. The downshift control chamber 188 is supplied with fluid from the secondary feed passage 150 through a passage 190 and a restriction 192. The pressure in the downshift control chamber 188 is controlled by a solenoid valve 194 such that when the solenoid valve 194 is deenergized the downshift control chamber 188 is in fluid communication through a passage 196 with an exhaust passage 198. When the solenoid valve is energized the passage 196 is closed permitting pressure to develop in the downshift control chamber 188 to impose a force on valve land a in opposition to the compression spring 186. Also in fluid communication with the valve bore 180 is a first brake apply passage 200, a second brake apply passage 202 and a control passage 204. A control passage 204 is in fluid communication with an inhibitor control chamber 206 adjacent valve land c. The valve bore 180 is also in fluid communication with a pair of exhaust ports 208 and 210 such that in the position shown the first brake apply passage 200 is exhausted between lands a and b and the second brake apply passage 202 is in fluid communication with the secondary feed passage 150 between lands b and c. When the solenoid valve 194 is energized thereby causing fluid pressure to develop in downshift chamber 188, the valve spool 184 will be moved against the compression spring 186 so that the first brake apply passage 200 is in fluid communication with the secondary apply passage 150 between lands a and b and the secondary brake apply passage 202 is exhausted between lands b and c. The first brake apply passage 200 is in fluid communication with the fluid motor 38 such that when the passage 200 is pressurized the first brake 36 is engaged thereby conditioning the transmission for first or low gear. The second brake apply passage 202 is in fluid communication with the fluid motor 50 such that when the passage 202 is pressurized the second brake 48 will be engaged thereby conditioning the transmission for second gear. It is obvious from the above description of the 1-2 shift valve 182 that passages 200 and 202 cannot be pressurized simultaneously.

The secondary feed passage 150 and the control passage 204 are both in fluid communication with a valve bore 212 of an inhibitor valve 214. The inhibitor valve 214 also includes a valve spool 216 having equal diameter spaced lands a and b slidably disposed in the valve bore 212, a compression spring 218 and a governor control chamber 220. The valve bore 212 is also in fluid communication with an exhaust passage 222 such that in the position shown the control passage 204 and inhibitor chamber 206 are exhausted while the secondary feed passage 150 is blocked by land b. The governor control chamber 220 is in fluid communication through a restriction 224 with the governor passage 176. As explained above for the inhibitor valve 162 the governor pressure in passage 176 will control the shift point of the inhibitor valve 214. This shift point can be controlled by the proper selection of the diameter of valve land a and the force in spring 218. By controlling either of these two parameters the shift point of the inhibitor valve 214 can be placed at a lower transmission speed value than the shift point of the inhibitor valve 162.

When the governor pressure in passage 176 is sufficient to cause the inhibitor valve 214 to shift the secondary feed passage 150 is communicated between lands a and b of valve spool 216 with the control passage 204 while the exhaust passage 222 is blocked by land a. At this time the inhibitor chamber 206 will be pressurized thereby imposing a force on valve land c cooperating with the force in spring 186 so that a downshift from second to first gear cannot be accomplished by energization of the solenoid valve 194 and an upshift from first to second gear will be accomplished if the transmission is in first gear. The pressure in inhibitor chambers 156 and 206 will be equal to the control pressure in downshift chambers 138 and 188 so that only light spring forces in springs 136 and 186 are necessary to maintain the valve spools 134 and 184 in their upshifted positions.

The solenoid valves 102, 120 and 144 and 194 are controlled by conventional electric shift controls 226 which may be manually operated to permit the vehicle driver to select the neutral, first, second, third or reverse drive ratio. If the vehicle is being operated in the third or high drive ratio and the output speed of the transmission is sufficient to cause the inhibitor valve 162 to shift thereby pressurizing inhibitor chamber 156 and the operator should select either second or first ratio, the transmission will not downshift until the governor pressure and therefore output speed of the transmission is reduced to permit the inhibitor valve 162 to assume the unshifted position. If the operator has selected a 3-1 downshift the transmission will downshift to second gear on the initial output speed decrease but will be held in second gear by the inhibitor valve 214 until the transmission output speed is decreased sufficiently to permit the inhibitor valve 214 to shift at which time the 1-2 shift valve 182 will downshift thereby disengaging the second brake 48 and engaging the first brake 46.

Obviously, many modifications and variations are possible in light of the above teaching. It is, therefore, to be understood that within the scope of the appended claims, the invention may be practiced otherwise than as specifically described.

What is claimed is:

1. A transmission and control comprising multi-ratio planetary gear means; fluid operated drive establishing means for establishing first, second and third drive ratios in said planetary gear means; a fluid source; a pair of shift control valve means in fluid communication with said source and said drive establishing means being shiftable for selectively controlling said drive establishing means and having a shift control chamber and an inhibitor chamber; transmission governor means for providing a signal responsive to the speed of the transmission; first inhibitor valve means in fluid communication with one of said shift control valve means, said governor means and the third ratio drive establishing means for directing fluid pressure from said source to said inhibitor chamber of said one shift control valve means for preventing downshifting of said one shift control valve means when said planetary gearing means is in the third ratio and said transmission speed is above a predetermined value to prevent a drive ratio change from the third ratio to the second; and second inhibitor valve means in fluid communication with the other shift control valve means, said governor means and the second ratio drive establishing means for directing fluid pressure from said source to said inhibitor chamber of said other shift control valve means when said planetary gear means is in said second ratio and said transmission speed is above a predetermined value to prevent a drive ratio change from the second ratio to the first ratio.

2. A transmission and control comprising multi-ratio planetary gear means; fluid operated drive establishing means for establishing first, second and third drive ratios in said planetary gear means; a fluid source; a first shift control valve having a valve bore in fluid communication with said source and said drive establishing means, a valve spool slidably disposed in the valve bore for selectively directing fluid from said source to said drive establishing means to control the establishment of the first, second and third drive ratios, a shift control chamber adjacent one end of the valve spool, and an inhibitor chamber adjacent the opposite end of the valve spool; a second shift control valve having a valve bore in fluid communication with said first shift control valve and said drive establishing means, a valve spool slidably disposed in the valve bore for selectively directing fluid from said first shift control valve to said drive establishing means to control the establishment of the first and second drive ratios, a shift control chamber adjacent one end of the valve spool and an inhibitor chamber adjacent the opposite end of the valve spool; transmission governor means for providing a signal responsive to the speed of the transmission; first inhibitor valve having a valve bore in fluid communication with the inhibitor chamber of said first shift control valve and the drive establishing means controlling the third ratio, a valve spool slidably disposed in the valve bore for directing fluid from the drive establishing means to the inhibitor chamber, and a governor chamber adjacent the valve spool in fluid communication with said governor means for inhibiting downshifting of said first shift control valve when said planetary gearing means is in the third ratio and said transmission speed is above a predetermined value to prevent a drive ratio change from the third ratio to the second; and second inhibitor valve having a valve bore in fluid communication with the inhibitor chamber of the second shift control valve and the first shift control valve, a valve spool slidably disposed in the valve bore for directing fluid from the first shift control valve to the inhibitor chamber, and a governor chamber adjacent the valve spool in fluid communication with said governor means for inhibiting downshifting of said second shift control valve when said planetary gear means is in said second ratio and said transmission speed is above another predetermined value to prevent a drive ratio change from the second ratio to the first ratio.

* * * * *